M. C. McCOY.
NUT LOCK.
APPLICATION FILED NOV. 10, 1914.
1,172,813.
Patented Feb. 22, 1916.
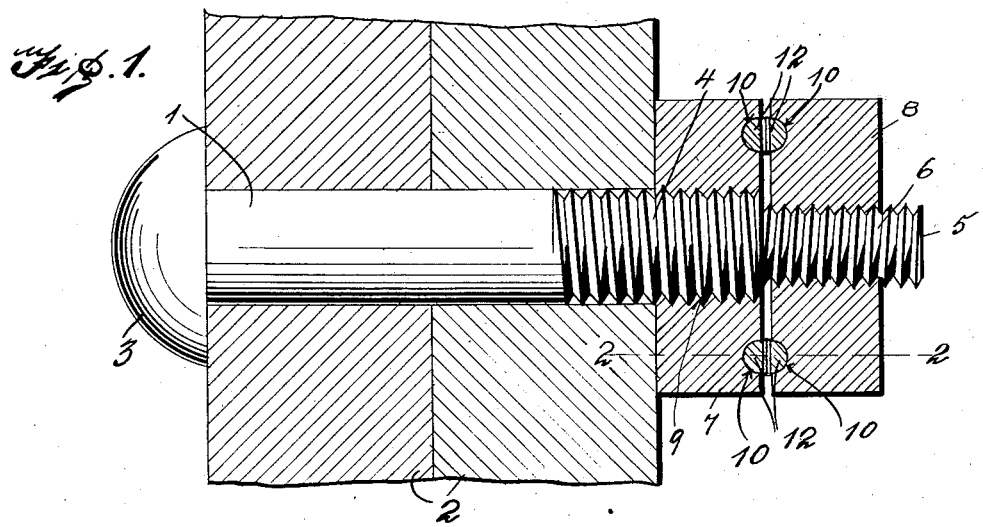
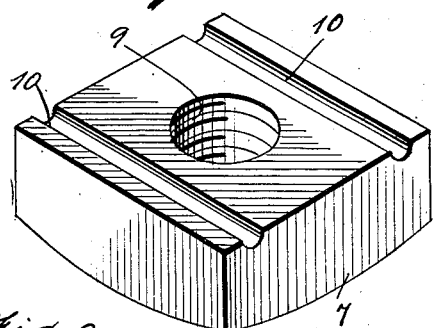
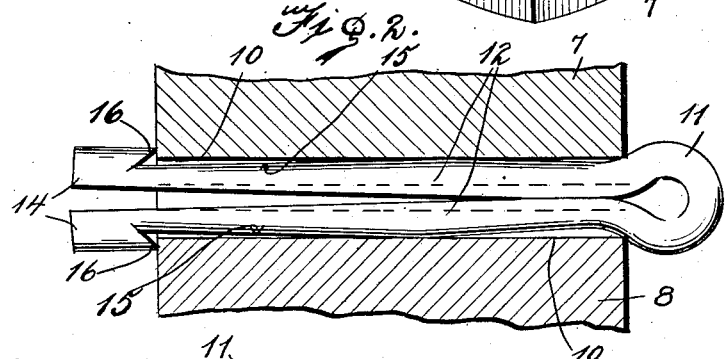
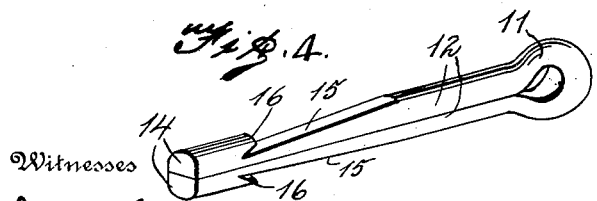
Inventor
M. C. McCoy.
Witnesses
By E. E. Vrooman & Co.
his Attorneys

UNITED STATES PATENT OFFICE.

MASON C. McCOY, OF WAITSBURG, WASHINGTON.

NUT-LOCK.

1,172,813.      Specification of Letters Patent.      Patented Feb. 22, 1916.

Application filed November 10, 1914. Serial No. 871,332.

*To all whom it may concern:*

Be it known that I, MASON C. McCOY, a citizen of the United States, residing at Waitsburg, in the county of Walla Walla and State of Washington, have invented certain new and useful Improvements in Nut-Locks, of which the following is a specification, reference being had therein to the accompanying drawing.

This invention relates to a nut lock, and has for its principal object the production of an efficient and simple means whereby the nut will be held in a set position upon the bolt after the same has been threaded thereon and locked.

Another object of this invention is the production of a nut lock in which the nut comprises a plurality of sections which are held against independent rotation by means of novel and efficient cotter-pins, carried by registering grooves, which are so formed as to hold against rotation within these grooves.

With these and other objects in view, this invention consists of certain novel constructions, combinations and arrangements of parts as will be hereinafter fully described and claimed.

In the drawing:—Figure 1 is a side elevation of the nut lock, particularly shown in cross section, illustrating the manner in which the nut is locked in position. Fig. 2 is a section taken on line 2—2, Fig. 1. Fig. 3 is a fragmentary detail perspective view of one of the sections of the nut. Fig. 4 is a detail perspective view of the cotter-pin.

Referring to the accompanying drawing by numerals, 1 designates the bolt which is carried by the supports 2, and which is provided with a head 3 bearing upon the support. Adjacent the outer end of the bolt is provided right-hand threads 4 and adjacent these right-hand threads 4 is formed a reduced shank 5 having left-hand threads 6. The primary section 7 of the nut is threaded upon the right-hand threads 4, while the auxiliary section 8 is carried by the shank 5. It is of course obvious that the threaded bore 9 of the primary section 7 is large enough to pass over the shank 5 so as to engage the threaded portion 4. These sections 7 and 8 are provided with parallel grooves 10, as clearly shown in Fig. 3, and these grooves are so formed as to come in registry with each other for allowing a suitable cotter-pin to be passed therethrough for holding the nut against rotation after the same is screwed upon the bolt.

It will be seen that the sections 7 and 8 are locked in position by means of the cotter-pin 11. The fingers 12 of this cotter-pin are tapered, as shown at 15, to form the shoulders 16 upon the thickened ends 14. The pin may be compressed, as shown in Fig. 4, at which time it may be forced through two of the grooves 10 and after the end-portions 14 thereof have passed through the grooves they will spring outwardly, as shown in Fig. 2, so as to allow the shoulders 16 to engage the outer surfaces of the sections 7 and 8 of the nut for preventing the cotter-pin from being accidentally withdrawn from the grooves.

It will be seen that the shoulders 16 are beveled inwardly toward the body portions of the ends 14 so that the portions of the shoulders which engage the nut will present biting edges which will bear upon the nut with a biting or digging action for holding the shoulders from accidentally slipping from engagement with the nut. Therefore, the fingers will normally remain in a spread relation, as shown in Fig. 2 so as to positively hold the pin in engagement with the nut, since the biting edges of the shoulders will be retained in engagement with the nut by the head of the pin bearing upon the opposite side surfaces of the nut, as shown in Fig. 2.

From the foregoing description it will be seen a very simple and efficient nut lock has been produced in which the sections of the nut are first threaded upon the bolt, these sections being so formed as to carry cotter-pins in such manner as to prevent the independent rotation of the sections while the cotter-pins will be prevented from rotating within the grooves. In this manner the cotter-pins will be prevented from accidentally falling out or otherwise becoming removed from engagement with the sections.

What I claim is:

In a nut lock of the class described, the combination of a bolt having right and left threads, a nut comprising a pair of sections carried by said threads, said sections provided with parallel registering grooves having straight side faces, cotter-pins carried within said grooves, each of said pins tapering inwardly toward one end to form shoulders, said shoulders having their inner portions beveled toward the body portion of said fingers so as to form biting edges, said pin having an enlarged head, said head bearing upon the outer surfaces of said sections, whereby said biting edges of said shoulders will be held in a biting engagement with the outer surfaces of said sections opposite to the surfaces engaged by said head, whereby said biting edges will hold said fingers from accidentally swinging to a closed position whereby said shoulders will hold said pin against accidental displacement.

In testimony whereof I hereunto affix my signature in presence of two witnesses.

MASON C. McCOY.

Witnesses:
J. E. BUTLER,
W. H. WALLACE.